(No Model.)
J. F. DOLLES.
BICYCLE TIRE.
No. 575,218. Patented Jan. 12, 1897.
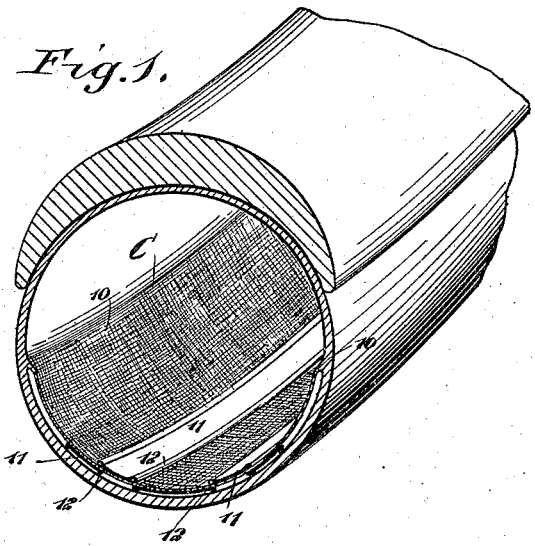
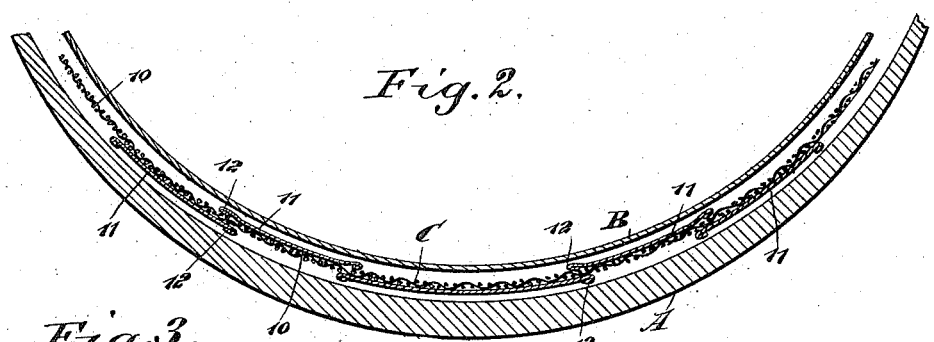
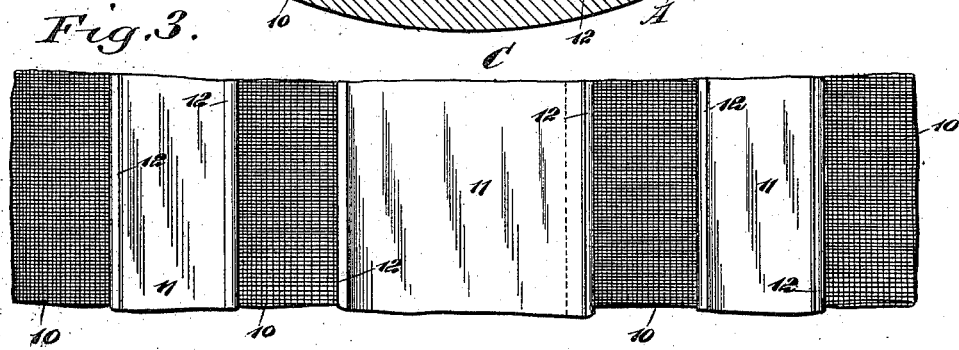
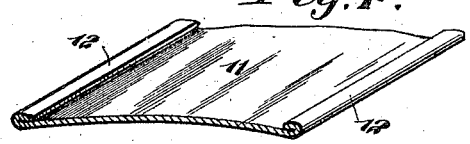
WITNESSES:
INVENTOR
J. F. Dolles.
BY
ATTORNEYS.

UNITED STATES PATENT OFFICE.

JOSEPH F. DOLLES, OF CHESTER, ILLINOIS.

BICYCLE-TIRE.

SPECIFICATION forming part of Letters Patent No. 575,218, dated January 12, 1897.

Application filed September 25, 1896. Serial No. 606,949. (No model.)

*To all whom it may concern:*

Be it known that I, JOSEPH F. DOLLES, of Chester, in the county of Randolph and State of Illinois, have invented a new and useful Improvement in Bicycle-Tires, of which the following is a full, clear, and exact description.

My invention relates to tires, and has especial reference to pneumatic tires for use in connection with bicycles and similar vehicles.

The object of the invention is to provide a protective shield for the tire which may be applied to a single or to a double tire and which will not in any manner detract from the resiliency of the tire.

Another object of the invention is to so construct the protective shield that its weight added to the tire will be trifling.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a section through a tire having the improvement applied, illustrating a single-tube tire only. Fig. 2 is a section through a portion of an outer and an inner tire and likewise a section through the shield, the section in Fig. 2 being enlarged over that shown in Fig. 1. Fig. 3 is a bottom plan view of a portion of the shield, and Fig. 4 is a detail perspective view of a portion of one of the bands used in the construction of the shield.

A represents the outer tire, and B the inner tire, the shield C being located adjacent to the inner face of the outer tire at its tread portion and between the outer tire and the tread-section of the inner tire, when such is used, as illustrated in Fig. 2. The shield is practically a diaphragm, and the body portion 10 of this diaphragm is made of canvas, the canvas being in a continuous strip and of a width sufficient to enable the sides of the canvas to be secured to the sides of the outer tube A, as illustrated particularly in Fig. 1. This attachment may be brought about in any approved manner, or the canvas may be woven in or form an integral portion of the aforesaid outer tire or tube.

A series of endless bands 11 is attached to the canvas body 10, and these bands are made of exceedingly light spring metal, steel, for example, and the bands are placed along the inner as well as the outer face of the body of the diaphragm, and in the preferred arrangement of these bands one of them is located at each side of the inner face of the body, while upon the under face of the body three bands are used, a central wide band and two other bands 11, which are placed near the side edges of the body. The bands on opposite sides of the body overlap, that is to say, the sides of the inner bands extend over upon the body portion of the outer bands, as is clearly shown in Fig. 2.

Each of the bands 11 is provided with a rib 12 along its sides, the ribs being bent over upon the outer faces of the bands, which outer faces are slightly convexed, the inner faces of the bands being correspondingly concaved, as illustrated in Fig. 4. The bands are overlapped to such an extent that it is almost impossible for any sharp object that may pass through the tread of the outer tire to pass between the inner and outer bands where they connect, and even should the inclination of the pointed instrument or object encountered be such as to find its way between the overlapping sides of the two bands the instrument would strike the rib 12 of the inner band or the rib of the outer band and be deflected or bent over to such an extent as to render it harmless.

It will be understood that the diaphragm or shield C is of an air-tight construction when employed in connection with a single-tube tire, but need not necessarily be air-tight when used in connection with a tire having an inner and an outer tube. The bands 11 are secured to the body 10 of the diaphragm in any suitable or approved manner.

It is evident that the diaphragm will add but little weight to the tire and will not in any manner mar the appearance of the tire, since it is located entirely upon the inside, and the fact also that the diaphragm is upon the inside of the tire prevents said diaphragm from stiffening the tire, and when the tire is inflated the air will serve as a cushion for the diaphragm, rendering the tire exceedingly resilient.

When the diaphragm lies between the outer and the inner or air tube of the tire, the diaphragm, when the tire is in use, will press against the inner or inflated tube, and it will serve as a cushion for the diaphragm.

The bands will not wear the tire, since they are concaved, thus preventing them from pressing against the tire to an injurious extent, and, furthermore, the edges of the bands being rolled to form the flanges 12, no sharp edges are presented to cut the tire, and especially as the shield is a diaphragm located at the inside of the tire. The bands may be secured to the canvas as closely grouped as circumstances may require.

Having thus described my invention, I claim as new and desire to secure by Letters Patent—

1. As a new article of manufacture, a protective shield for pneumatic tires, consisting of a body of a pliable material and a series of endless metallic bands alternately arranged on each side of said body and to which they are attached, the said bands having their edges overlapping and bent over upon the outer faces of the bands to form ribs, as and for the purpose specified.

2. The combination, with a pneumatic tire, of a shield or diaphragm located within the tire and following the tread portion thereof, extending from side to side of the tire, the said diaphragm being continuous and consisting of a flexible body secured at its sides to the tire, and bands of a spring material secured to the outer and the inner faces of the said flexible body, following the circumference of the tire, the bands upon opposite sides of the said body having their edges overlapped, and each band being provided with ribs at its side edges, as and for the purpose set forth.

3. The combination, with a pneumatic tire, of a shield or diaphragm located within the tire and following the tread portion thereof, extending from side to side of the tire, the said diaphragm consisting of an endless canvas body secured at its side edges to the tire, and thin metal bands secured upon the inner and the outer faces of the canvas body, the arrangement of the bands being such that the edges of the bands on the inner and on the outer faces of the body of the diaphragm will overlap, the bands being placed one at each side of the center on the inner face of the canvas body and at the center of the under face of the body and near the edges, each band having its edge bent downward upon the body to form a continuous side rib, as and for the purpose set forth.

4. The combination, with a pneumatic tire, of a shield or diaphragm located within the tire and following the tread portion thereof, extending from side to side of the tire, the said diaphragm consisting of an endless canvas body secured at its side edges to the tire, and thin metal bands secured upon the inner and the outer faces of the canvas body, the arrangement of the bands being such that the edges of the bands on the inner and on the outer faces of the body of the diaphragm will overlap, the bands being placed one at each side of the center on the inner face of the canvas body and at the center on the under face of the body, and near the edges, each band having its edge bent downward upon the body to form a continuous side rib, and each band being also further provided with a concaved inner and a convexed outer face, as and for the purpose set forth.

JOSEPH F. DOLLES.

Witnesses:
CHAS. Q. DOLLES,
WM. R. KARSTETER.